(12) United States Patent
Lehnert et al.

(10) Patent No.: US 10,409,790 B2
(45) Date of Patent: Sep. 10, 2019

(54) DATA RETENTION RULE GENERATOR

(71) Applicant: SAP SE, Walldorf (DE)

(72) Inventors: Volker Lehnert, Schriesheim (DE); Carsten Pluder, Spiesen-Elversberg (DE)

(73) Assignee: SAP SE, Walldorf (DE)

( * ) Notice: Subject to any disclaimer, the term of this patent is extended or adjusted under 35 U.S.C. 154(b) by 519 days.

(21) Appl. No.: 14/727,838

(22) Filed: Jun. 1, 2015

(65) Prior Publication Data

US 2016/0350339 A1 Dec. 1, 2016

(51) Int. Cl.
*G06F 16/21* (2019.01)
*G06F 16/23* (2019.01)
*G06Q 10/10* (2012.01)

(52) U.S. Cl.
CPC ............ *G06F 16/217* (2019.01); *G06F 16/21* (2019.01); *G06F 16/2379* (2019.01); *G06Q 10/10* (2013.01)

(58) Field of Classification Search
CPC ......... G06F 17/30289; G06F 17/30306; G06F 17/30377; G06F 17/30082–30085; G06F 16/217; G06F 16/21; G06F 16/2379; G06Q 10/10
USPC ....................................................... 707/694
See application file for complete search history.

(56) References Cited

U.S. PATENT DOCUMENTS

| | | | |
|---|---|---|---|
| 7,107,416 B2 | 9/2006 | Stuart et al. | |
| 7,574,419 B2 | 8/2009 | Krishnaswamy et al. | |
| 7,801,863 B2 | 9/2010 | Brown et al. | |
| 7,831,567 B2 | 11/2010 | Luther et al. | |
| 7,899,793 B2 * | 3/2011 | Mimatsu | H04L 67/322 707/661 |
| 8,145,606 B2 | 3/2012 | Herbst et al. | |
| 8,180,742 B2 | 5/2012 | Claudatos et al. | |
| 8,452,741 B1 | 5/2013 | Kuhr | |
| 8,620,869 B2 | 12/2013 | Consul et al. | |
| 8,812,464 B2 | 8/2014 | Sambamurthy et al. | |
| 9,201,877 B1 * | 12/2015 | Humby | G06F 16/00 |
| 9,547,833 B2 * | 1/2017 | Kahn | G06Q 40/06 |
| 2005/0055519 A1 * | 3/2005 | Stuart | G06F 17/30082 711/159 |
| 2005/0210041 A1 * | 9/2005 | Taguchi | G06F 3/0605 |
| 2007/0271308 A1 * | 11/2007 | Bentley | G06F 17/30011 |
| 2007/0276843 A1 | 11/2007 | Lillibridge et al. | |

(Continued)

OTHER PUBLICATIONS

Examination Report for EP Application No. 16001239.9-1952, dated Oct. 4, 2016, 8 pages; EPO, Munich, Germany.

*Primary Examiner* — Grace Park
*Assistant Examiner* — Jessica N Le
(74) *Attorney, Agent, or Firm* — Buckley, Maschoff & Talwalkar LLC (57) ABSTRACT

Various embodiments of systems and methods to determine data retention rules for data entities are described herein. In one aspect, the data entities are obtained. Usage statuses of the data entities are determined. One or more purpose of data corresponding to the one or more data entities is received. Further, legal entities corresponding to the one or more data entities are identified based on line organization attributes and the usage statuses. Process object attributes associated with the one or more data entities are identified based on the legal entities. Retention rules for the one or more data entities are determined based on the one or more purpose of data, the legal entities and the process object attributes.

17 Claims, 11 Drawing Sheets

(56) References Cited

U.S. PATENT DOCUMENTS

| | | |
|---|---|---|
| 2009/0150168 A1 | 6/2009 | Schmidt |
| 2009/0150866 A1 | 6/2009 | Schmidt |
| 2012/0331284 A1 | 12/2012 | Kouladjie et al. |
| 2013/0024429 A1* | 1/2013 | Raas .................... G06Q 10/10 707/689 |
| 2013/0332422 A1 | 12/2013 | Bader et al. |
| 2014/0032600 A1* | 1/2014 | Sarferaz ................. G06F 12/14 707/781 |
| 2014/0109238 A1* | 4/2014 | Ravindran ......... G06Q 10/0635 726/27 |
| 2014/0236910 A1 | 8/2014 | Owuor et al. |
| 2017/0091294 A1* | 3/2017 | Vibhor .............. G06F 17/30557 |

* cited by examiner

| DATA ENTITY 510 | ILM OBJECT 530 | USAGE STATUS 520 | PURPOSE OF DATA 540 |
|---|---|---|---|
| SALES ORDER | SD_VBAK | YES | CONTRACT FULFILLMENT END CUSTOMER |
| SALES ORDER | SD_VBAK | YES | CONTRACT FULFILLMENT PHARMACIES |
| BILLING DOCUMENTS | SD_VBRK | YES | CONTRACT FULFILLMENT END CUSTOMER |
| BILLING DOCUMENTS | SD_VBRK | YES | CONTRACT FULFILLMENT PHARMACIES |

FIG. 5

| LOA 610 | LEGAL ENTITY 620 |
|---|---|
| BUKRS 1000 | IDES SE |
| WERKS 3000 | IDES SE |
| BUKRS 2000 | IDES DEUTSCHLAND SE |
| WERKS 4545 | IDES DEUTSCHLAND SE |
| KOKRS 8000 | IDES FRANCE |

FIG. 6

| PURPOSE 710 | LEGAL ENTITY 720 | POA 730 | RETENTION PERIOD 740 |
|---|---|---|---|
| CONTRACT FULFILLMENT | IDES SE | DOCUMENT TYPE "AA" | 10 YEARS |
| CONTRACT FULFILLMENT PHARMACIES | IDES SE | DOCUMENT TYPE "AC" | 30 YEARS |
| ACCOUNTING - TRUE AND FAIR PRINCIPLE | IDES DEUTSCHLAND SE | PO TYPE "NB" | 6 YEARS |
| HGB / AKTG / GMBHG / AO | IDES DEUTSCHLAND SE | PO TYPE "NB" | 6 YEARS |
| WORKING CONTRACT | IDES FRANCE | TASK TYPE "W" | 20 YEARS |

| DATA ENTITY 1150 | PURPOSE OF DATA 1120 | LEGAL ENTITY 1130 | POA 1140 | OTHER PURPOSE A | OTHER PURPOSE B |
|---|---|---|---|---|---|
| CUSTOMER INVOICE | CONTRACT FULFILLMENT | IDES SE | DOCUMENT TYPE | ACCOUNTING LEGISLATION, TAX LEGISLATION | NONE |
| G/L ACCOUNT DOCUMENT | ACCOUNTING – TRUE AND FAIR PRINCIPLE | IDES SE | DOCUMENT TYPE | ACCOUNTING LEGISLATION, TAX LEGISLATION | NONE |
| PURCHASE ORDER | CONTRACT | IDES SE | PO TYPE | ACCOUNTING LEGISLATION, TAX LEGISLATION | PHARMACEUTICAL LEGISLATION LIKE FDA, LEGISLATION FOR AEROSPACE AND DEFENSE |
| PURCHASE ORDER | NO OTHER THAN HGB / AKTG / GMBHG / AO | IDES DEUTSCHLAND SE | PO TYPE | ACCOUNTING LEGISLATION, TAX LEGISLATION | NONE |
| TIME SHEET DATA | WORKING CONTRACT | IDES DEUTSCHLAND SE | TASK TYPE | ACCOUNTING LEGISLATION | TAX LEGISLATION |

DATA RETENTION RULE GENERATOR

FIELD

Embodiments generally relate to information management in computer systems, and more particularly to methods and systems to provide a data retention rule generator.

BACKGROUND

Information technology (IT) system landscapes continue to grow in size and complexity due to various factors such as mergers, acquisitions and business growth. Thereby the amount of electronic data or information that is handled and managed by organizations continues to grow. Storing the information handled within an organization may not be feasible due to cost associated with providing and maintaining data storage hardware as well as back-up storage capabilities, and cost associated with data management services. For example, information such as the amount payable for a certain sales order has a life cycle that often begins with creation of a data entity (e.g., the sales order) in the system. During the lifecycle, the information (e.g., amount payable for the order) is passed to other data entities like invoice or copies of the extracts of the original data that are copied to information warehouses. Further, the data entities have a lifecycle that may end with the disposition or destruction of the data. The end of the lifecycle of the information may be reached when the last bit of data containing the information is destroyed.

Therefore, the lifecycle of the information may begin with creation of the information and conclude with the disposition or destruction of the information. One of the challenges in information lifecycle management (ILM) is retention management. For example, person related data may need to be deleted upon the completion of primary purpose of the data, but may have to be considered for additional retention periods (e.g. Tax Legislation, Insurance Legislation).

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to provide a data retention rule generator are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
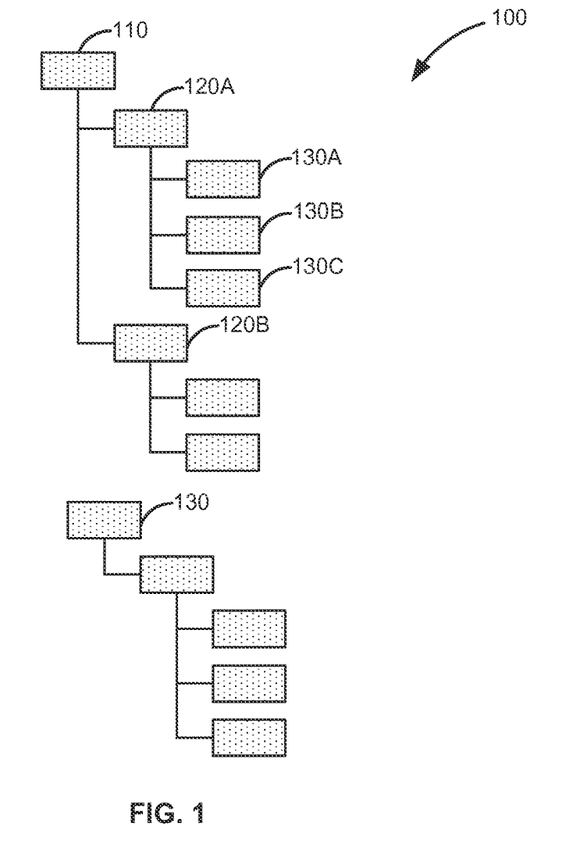
FIG. 1 is a block diagram of an exemplary line organization, according to an embodiment.

FIG. 1 is a block diagram of exemplary line organization 100, according to an embodiment. An organization can be described with attributes such as line organizational attributes (LOA). An example for the LOA can be "company code." Further, the organization may include multiple subsidiaries (e.g., legal entities) within organization. For example, if "IDES SE" is a legal entity, company codes "BUKRS 1000" and "WERKS 3000" are grouped under the legal entity "IDES SE."

The line organization 100 reflects formal organization depicting a hierarchical structure of the legal entities (e.g., in terms of nodes 110 and 130, child nodes 120A and 120B, and sub-child nodes 130A to 130C) associated with the organization. Further, the line organization reflects the relation of organizational units and employees based on the contractual relation which describes a legal entity. The legal entity can be a lawful or legally standing association, corporation, partnership, proprietorship or individual that has legal capacity to enter into agreements or contracts. Also, the legal entity is a key for the reason that legislation are focusing on a single legal entity. For example, financial retention periods focus on a financial statement entity (i.e., the legal entity).

Figure 2:
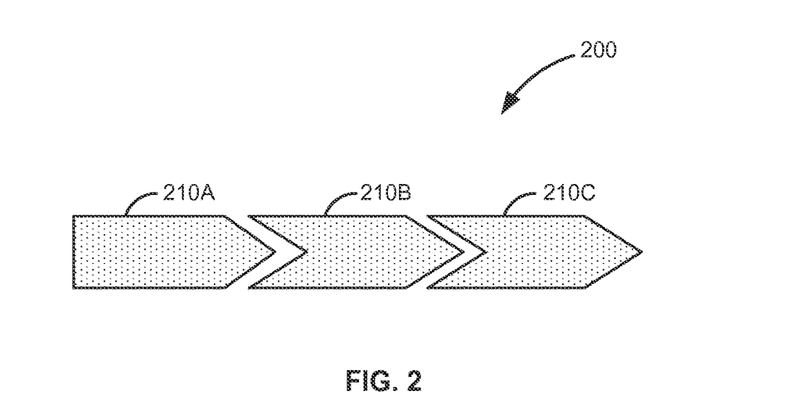
FIG. 2 is a block diagram of an exemplary process organization, according to an embodiment.

FIG. 2 is a block diagram of exemplary process organization 200, according to an embodiment. End-to-end business process of an organization can be described with attributes such as process organizational attributes (POA). Examples for the POA can be "document type" in accounting, "purchase order type" in sales and the like. The process organization 200, referred as a business process or an application process, can be defined as a self-contained sequence of tasks or steps (e.g., 210A to 210C) that can be executed by organizational units or organizations to distribute the work. Further, the application process can be specific to certain markets or products. In one exemplary embodiment, the application process runs across different organizational entities within a single legal entity or across different legal entities.

Figure 3:
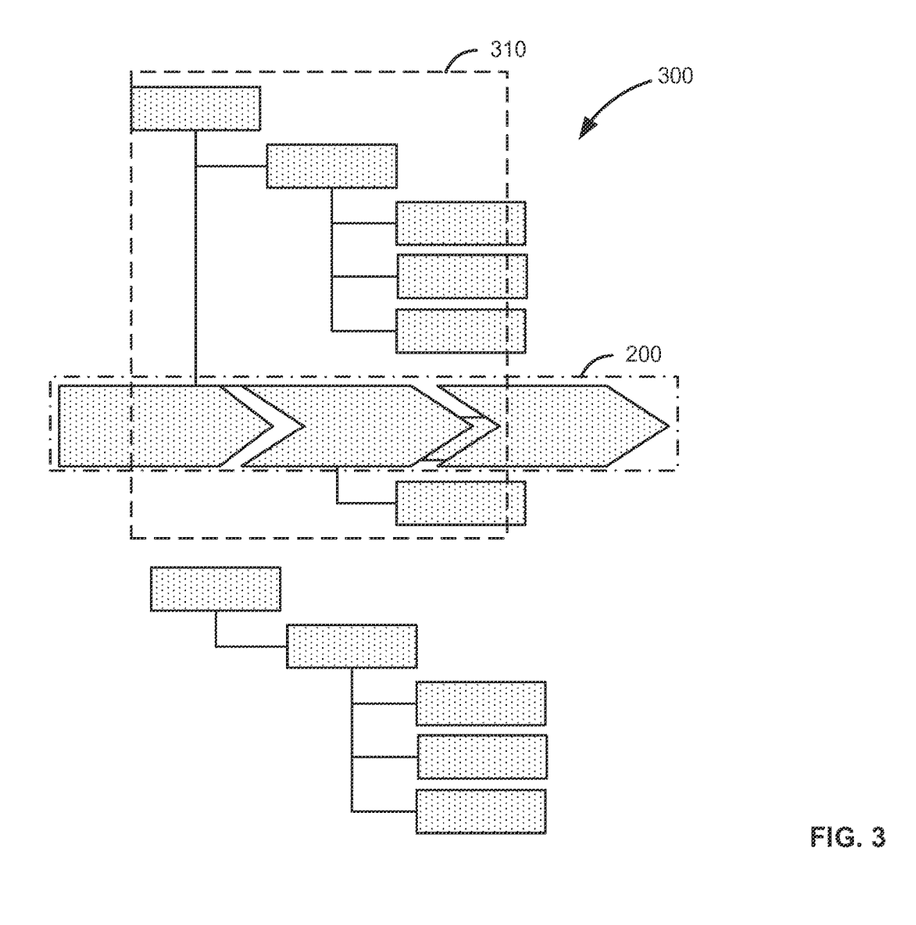
FIG. 3 is a schematic diagram illustrating example purpose of data, according to an embodiment.

FIG. 3 is a schematic diagram illustrating example purpose of data 300, according to an embodiment. The purpose of the data 300 undergoing processing is inherently defined by a legal entity or a combination or group of the legal entities (e.g., 310, i.e., a part of legal entities of FIG. 1 involved in the business process) and the business process (e.g., 200 of FIG. 2) where the data is used. Further, the purpose of data defines a basic retention period in information lifecycle management (ILM). The ILM includes data retention policies, which are organization's established protocol for retaining information for operational or regulatory compliance needs, such as a retention period, an expiration date and the like, of the data. The objectives of a data retention policy based on Data Privacy principals is to ensure, that data is deleted as soon as the corresponding late retention period has ended. Also before deleting, blocking the data after a primary purpose has ended. Thereby, different types of information are held for different lengths of time.

For example, the information may be destroyed according to various reasons, such as legal requirements, business policies, and so forth. In other situations, the information may become relevant to or evidence in a legal matter or proceeding. Thus, notwithstanding otherwise applicable reasons, the information requires extended retention for use to resolve the legal proceeding.

In one embodiment, organizational attributes (e.g., LOA and POA) and the purpose of the data are mapped in an integrated perspective. Accordingly, a retention rule generator determines the applicable retention rules based on the purpose of data, the legal entity information and the process organization. Further, the determined retention rules are implemented in the information lifecycle management (ILM) process for identifying time frames of the data entities.

Figure 4:
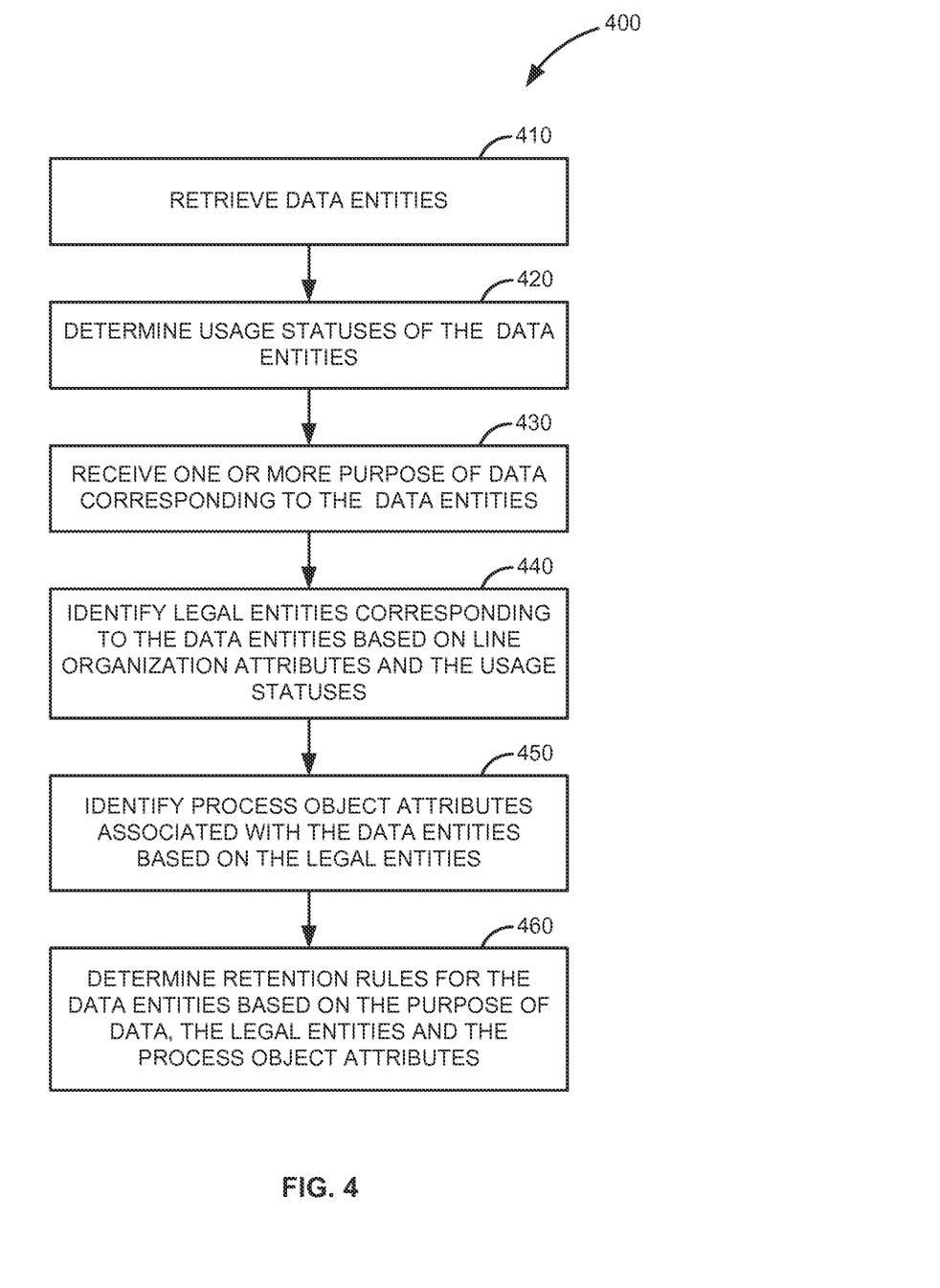
FIG. 4 is a flow diagram illustrating an example process to determine retention rules for data entities, according to an embodiment.

FIG. 4 is a flow diagram illustrating example process 400 to determine retention rules for data entities, according to an embodiment. At 410, the data entities are obtained. The data entities can be referred as application data or business objects or data objects, which include data associated with one or more business applications or modules. Further, obtaining data entities further includes obtaining information lifecycle management (ILM) objects associated with the data entities. The ILM refers to a wide-ranging set of strategies for administering storage systems on computing devices and includes one or more ILM objects. The ILM object enhances either an archiving object or a data destruction object with the information for data destruction. The ILM object contains settings for the definition and evaluation of ILM rules. ILM rules are used for the lifecycle management of the data entities. Further, the ILM objects contain specifications for determining the start and end dates of a period in the lifecycle of the data entities.

At 420, usage statuses of the data entities are determined. In one exemplary embodiment, the usage statuses are determined by an entity analyzer by evaluating the data entities usage in a current system of an organization. At 430, one or more purpose of data corresponding to the data entities is received. The purpose of data is retrieved from a database and/or can be assigned manually. Further, a first database table is generated to store the data entities, purpose of data associated with the data entities, and usage statuses of the data entities.

Figure 5:
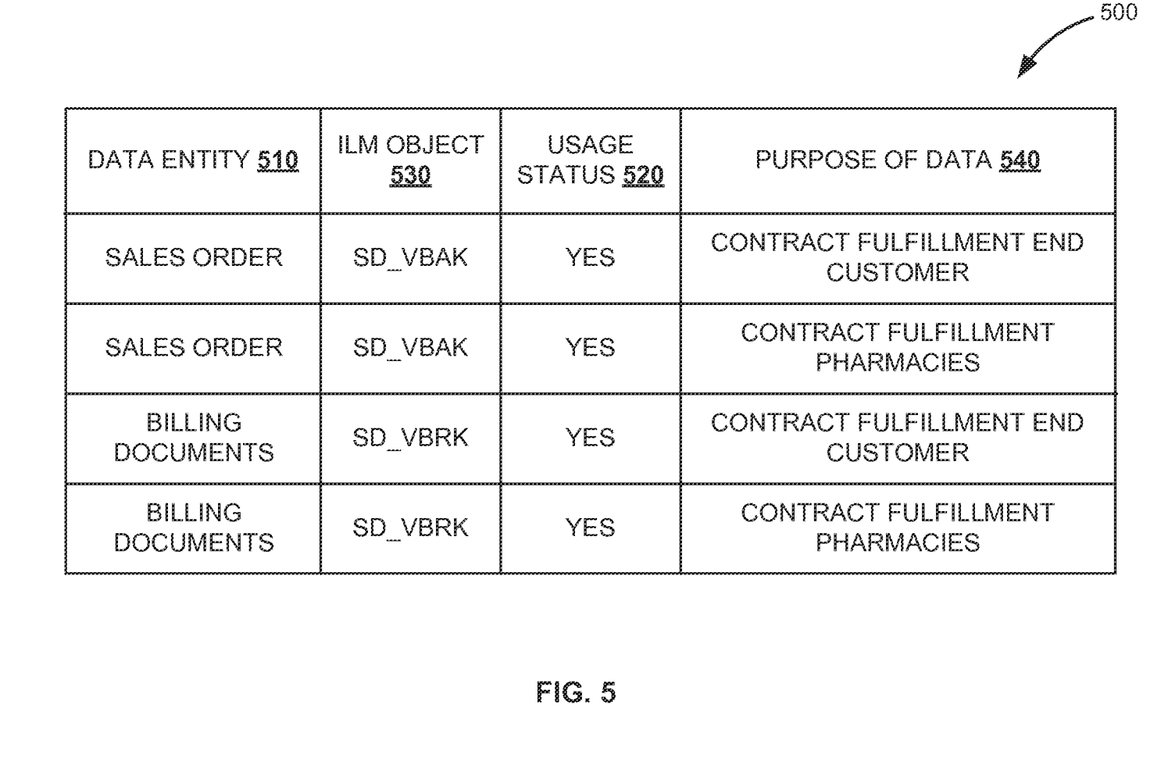
FIG. 5 is a tabular diagram illustrating an example first database table, according to an embodiment.

The first database table includes a plurality of columns. First column may include the obtained data entities and a second column may include associated ILM object. Further, a third column may include the usage statuses of the data entities. Usage status of a data entity defines whether the data entity is used for an application process of an organization or not. The forth column may include the purpose of data associated with the data entity. In one exemplary embodiment, the purpose of data can be retrieved from a database and/or the purpose of data can be assigned manually. An exemplary first database table is depicted in FIG. 5.

Figure 6:
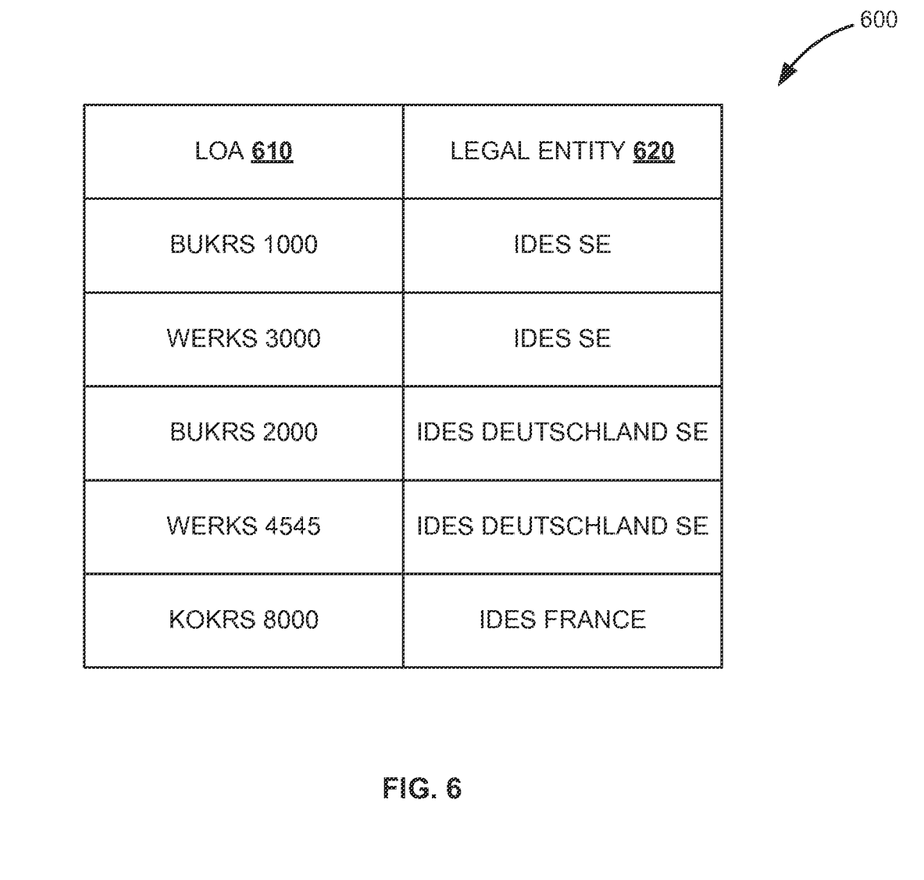
FIG. 6 is a tabular diagram illustrating an example second database table, according to an embodiment.

At 440, legal entities corresponding to the data entities are identified based on line organization attributes (LOA) and the usage statuses. Identifying legal entities includes receiving linkage information of the LOA and the corresponding legal entities. A second database table is generated to the legal entities associated with the data entities and corresponding LOA. The LOA are evaluated automatically based on the usage statuses of the data entities. Further, the LOA corresponding to the data entities are stored automatically in a column of the second database table. Further, the process allows linking of the LOA to corresponding legal entities and is stored in another column of the second database table. An exemplary second database table is depicted in FIG. 6.

Figure 7:
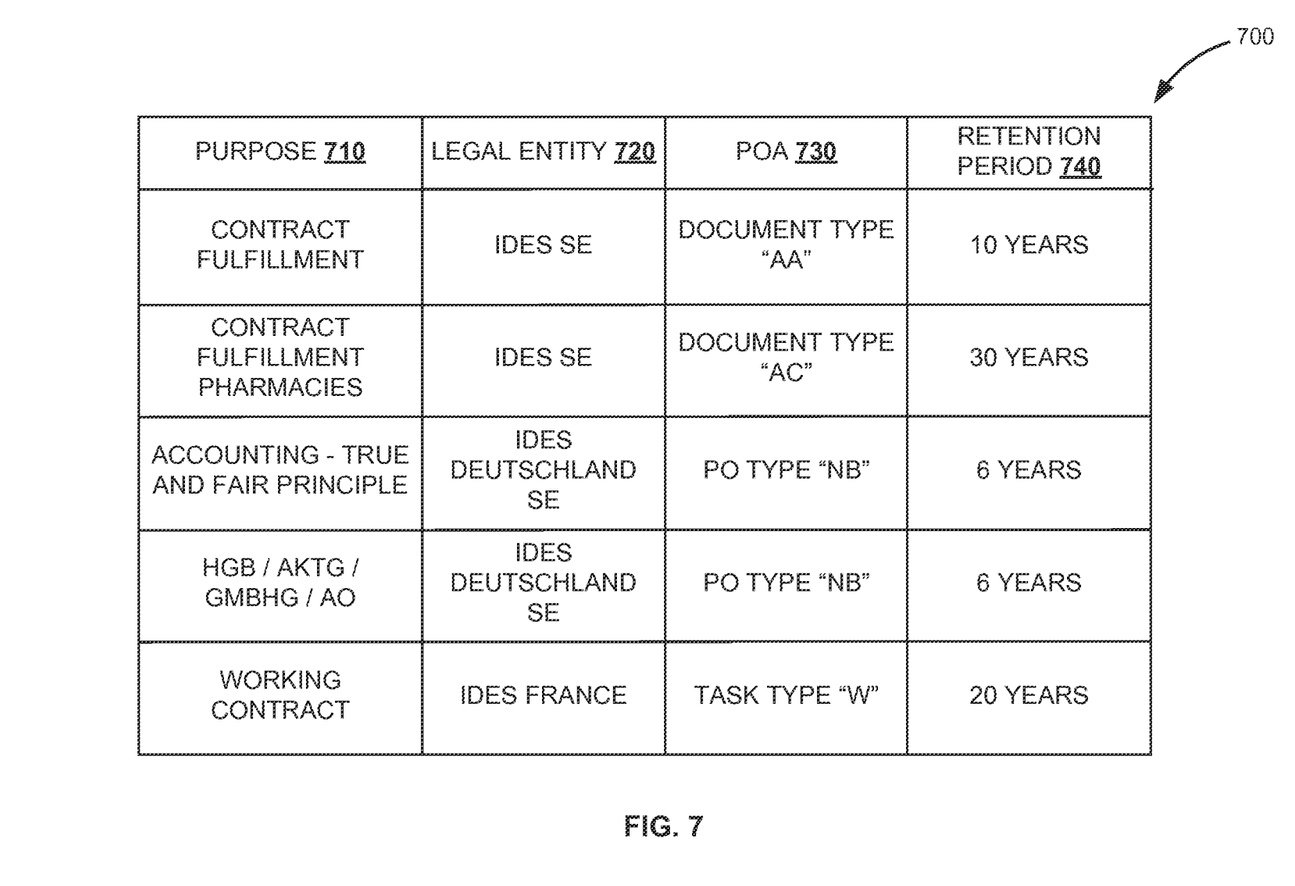
FIG. 7 is a tabular diagram illustrating an example third database table, according to an embodiment.

At 450, process object attributes (POA) associated with the data entities are identified based on the legal entities. Further, a third database table is generated to store POA associated with the data entities. The third database table allows linking of legal entity with the POA. At 460, the retention rules for the data entities are determined based on the purpose of data, the legal entities and the POA. Further, the determined retention rules are stored in the third database table. Thereby the third database table provides a retention period per purpose of data, the POA and legal entity can get defined as final abstraction layer of a retention rule generator to enable a simplified retention policy definition. An exemplary third database table is depicted in FIG. 7.

In one embodiment, the determined retention rules are modified based on additional legal retention periods or secondary purpose. The additional legal retention periods can be related to the legal entities and/or secondary process purposes. For example, the purchase order document types may have different applicable retention periods. In the purchase order, apart from "normal PO", there can be "stock transfer PO" applicable internal to the organization and has to be considered while determining the retention rules. The secondary purpose is described in greater detail in FIG. 11.

In one embodiment, based on the determined retention rules, the data entities and corresponding ILM objects are grouped into objects or rules, and stored in the ILM system to generate a report depicting necessary system customizing and ILM residence/retention rules for the referenced business partner or customer. For example, for a customer having two "FI documents" in different company codes with different retention periods, two different retention rules are applicable. For example, for a "company code 1000", retention period can be 10 years and for a "company code 2000", retention period can be 6 years. In the example, two attributes such as "company code" and "document type" has to be considered. Therefore, documents where the same retention rules are applicable are logically grouped in an object group. In relation to the object group, rule groups can get created. In the example, a rule group with retention of 10 years and a rule group with retention of 6 years can be maintained, which may facilitate the customer in maintaining the documents.

FIG. 5 is a tabular diagram illustrating example first database table 500, according to an embodiment. The first database table 500 includes plurality of columns (e.g., 510, 520, 530 and 540). First column includes data entity 510 and a second column may include associated ILM object 530. For example, data entities "sales order" and "billing documents" and associated ILM object "SD_VBAK" are obtained and stored in the first database table 500. Further, a third column may include the usage status 520 of the data entities. The usage status of a data entity defines whether the data entity is used for an application process of an organization or not. The forth column may include the purpose of data 540 associated with the data entity. In one exemplary embodiment, the purpose of data can be retrieved from a database and/or the purpose of data can be assigned manually.

FIG. 6 is a tabular diagram illustrating example second database table 600, according to an embodiment. The second database table 600 includes plurality of columns (e.g., 610 and 620). The second database table 600 is generated to store legal entities 620 associated with the data entities based on line organization attributes (LOA) 610 corresponding to the usage statuses (e.g., 520 of FIG. 5). The LOA 610 are evaluated automatically based on the usage statuses of the data entities are stored automatically in a column of the second database table. Further, LOA 610 is linked to corresponding legal entity 620. For example, LOA 610, company codes "BUKRS 1000" and "WERKS 3000" are linked to the legal entity "IDES SE"; "BUKRS 2000" and "WERKS 4545" are linked to the legal entity "IDES DEUTSCHLAND SE", and "DODRS 8000" is linked to "IDES FRANCE."

FIG. 7 is a tabular diagram illustrating example third database table 700, according to an embodiment. The third database table 700 includes plurality of columns (e.g., 710, 720, 730 and 740). The third database table 700 is generated to store process object attributes (POA) 730 associated with the data entities based on the legal entities 720. The third database table allows linking of legal entity 720 with the POA 730. At 440, the retention rules for the data entities are determined based on the purpose of data, the legal entities and the POA. For example, a data entity having POA "DOCUMENT TYPE AA" associated with a legal entity "IDES SE" and including a purpose of data "CONTRACT FULFILLMENT" can have a retention period of 10 years.

Figure 8:
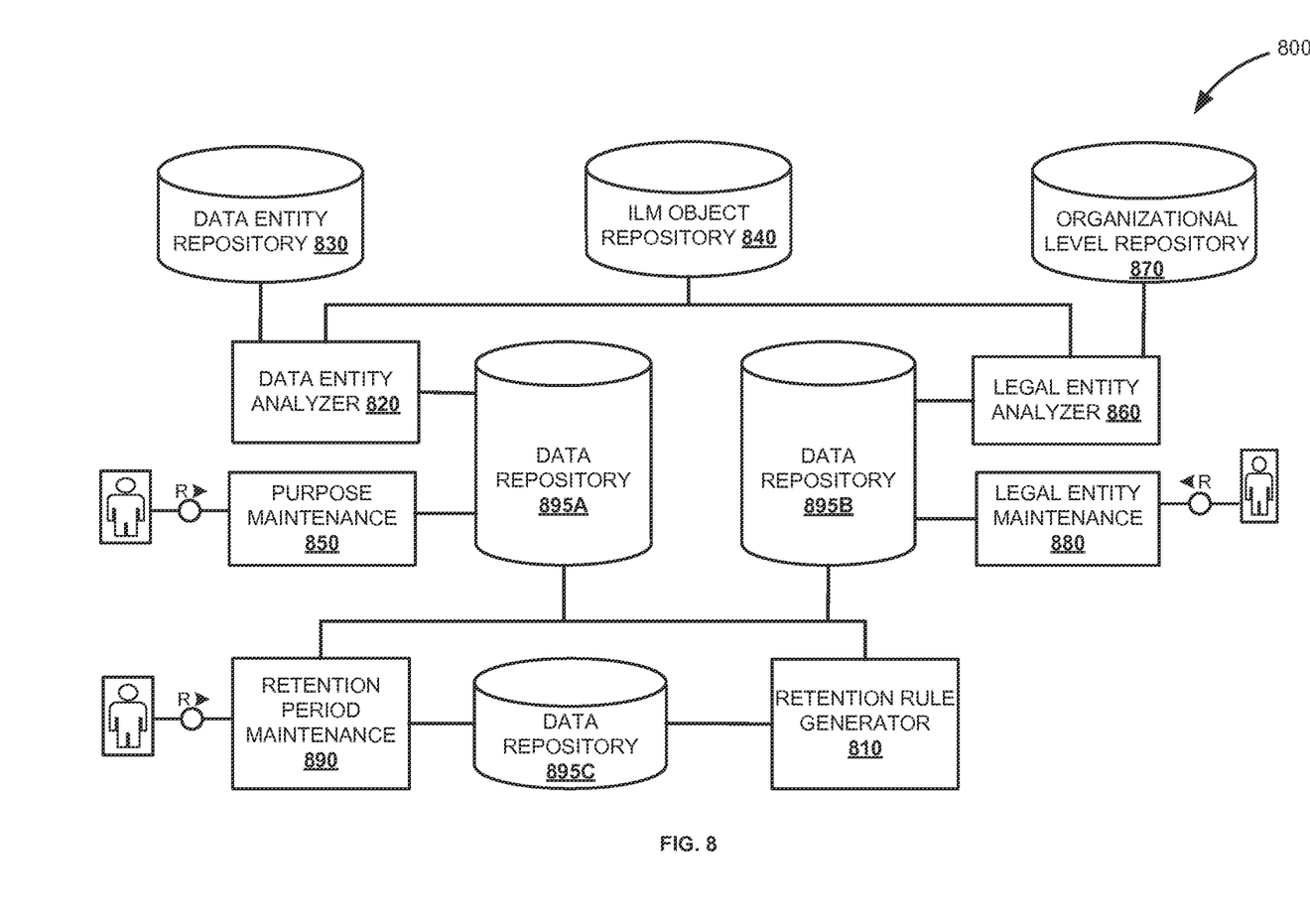
FIG. 8 is a block diagram illustrating, at a high-level, functional components of an example system for implementing a retention rule generator, according to an embodiment.

FIG. 8 is a block diagram illustrating, at a high-level, functional components of example system 800 for implementing retention rule generator 810 according to an embodiment. The system 800 includes plurality of modules to perform process as described in FIG. 4. The first database table, the second database table and the third database table depicted in FIGS. 5 to 7 are stored in different data repositories. For example, the first database table is stored in data repository 895A, the second database table is stored in data repository 895B and the third database table is stored in data repository 895C.

In one embodiment, data entity analyzer 820 retrieves application data from data entity repository 830 and corresponding ILM objects from ILM object repository 840 and further stored in the first database table of data repository 895A. Further, the data entity analyzer 820 determines usage statuses of the data entities, which is stored in the first database table. Purpose maintenance 850 provides an option for a customer to assign data purpose corresponding to the obtained data entities, which is further stored in the first database table.

In one embodiment, legal entity analyzer 860 retrieves line organization attributes (LOA) associated with the obtained data entities from organizational level repository 870. Legal entity maintenance 880 provides an option for the customer to assign the LOA to associated legal entities. Further, the LOA and the legal entities are stored in the second database table of the data repository 895B.

In one embodiment, the third database table of the data repository 895C stores process object attributes (POA) associated with the data entities based on the legal entities. The retention rule generator 810 determines retention rules for the data entities based on the purpose of data from the data repository 895A, the legal entities from the data repository 895B and the POA and stores in the third database table. Further, retention period maintenance 890 provides an option for the customer to modify the determined retention rules based on secondary purpose.

Therefore, the retention rule generator 810 identifies all used data entities (e.g., using the data entity analyzer 820) and determines specific organizational levels of each data entity and the related legal entity (e.g., using the legal entity analyzer 860). Further, the system 800 provides an option to add purposes of data in terms of data privacy and other purposes based on the legal entity or secondary processes (e.g., using the purpose maintenance 850). Thereby the system 800 creates required retention policies for the data entity in the ILM framework and eventually creates required residence and retention policies for referenced business partner functionality.

Figure 9:
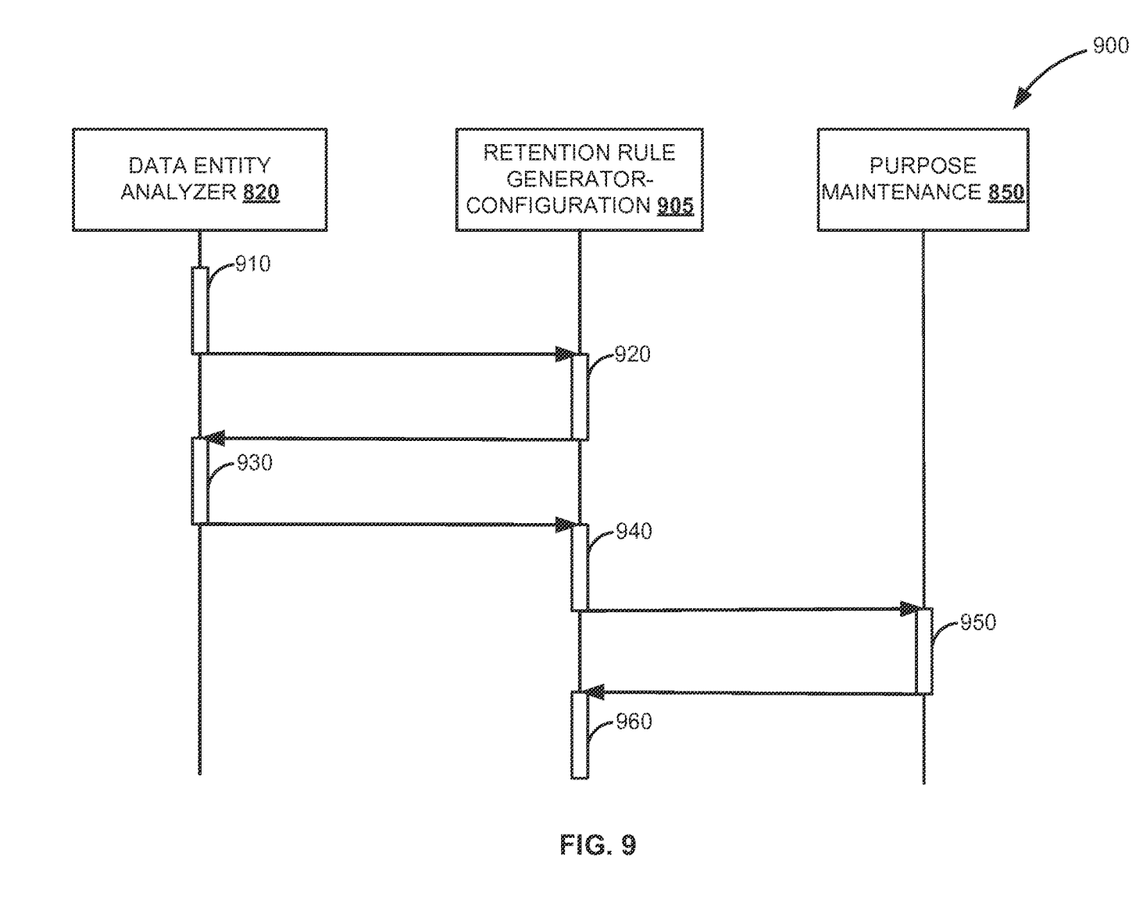
FIG. 9 is a sequence diagram illustrating an exemplary data flow between a data entity analyzer, a retention rule generator and purpose maintenance in a network, according to an embodiment.

FIG. 9 is a sequence diagram illustrating exemplary data flow 900 between the data entity analyzer 820, the retention rule generator-configuration 905 and the purpose maintenance 850 of FIG. 8 in a network, according to an embodiment. The sequence diagram represents the interactions and the operations involved between the data entity analyzer 820, the retention rule generator-configuration 905 and the purpose maintenance 850. The vertical lines of the data entity analyzer 820, the retention rule generator-configuration 905 and the purpose maintenance 850 represent the processes that may exist simultaneously. Activation boxes (e.g., 910, 920, 930, 940, 950 and 960) between the horizontal arrows represent the processes performed in the respective process object (e.g., the data entity analyzer 820, the retention rule generator-configuration 905 and the purpose maintenance 850).

At 910, the data entity analyzer 820 obtains data entities and corresponding ILM objects. Upon obtaining the data entities, the data entities are stored in a database table accessible by the retention rule generator-configuration 905 at 920. The retention rule generator-configuration 905 maintains functionality aspect of the retention rule generator 810 of FIG. 8. At 930, the data entity analyzer 820 evaluates data entity usage in a current system and provides usage statuses of the data entities. At 940, the usage status information is stored in the database table, which can be accessible by the retention rule generator-configuration 905. At 950, the purpose maintenance 850 provides an option to assign purpose of data corresponding to the data entities. Further at 960, the purpose of data is stored in the database table.

Figure 10:
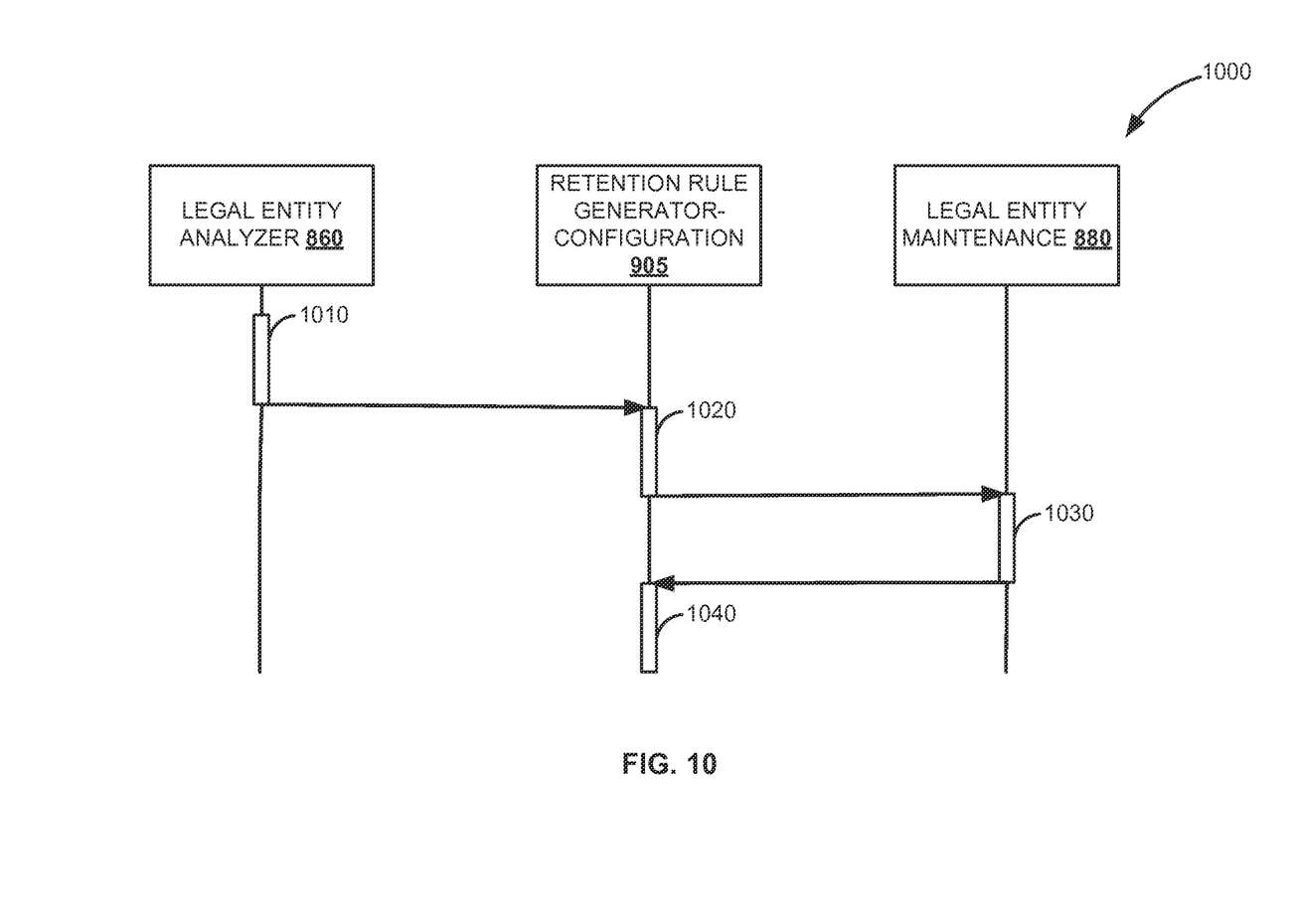
FIG. 10 is a sequence diagram illustrating an exemplary data flow between a legal entity analyzer, a retention rule generator and legal entity maintenance in a network, according to an embodiment.

FIG. 10 is a sequence diagram illustrating exemplary data flow 1000 between the legal entity analyzer 860, the retention rule generator-configuration 905 and the legal entity maintenance 880 of FIG. 8 in a network, according to an embodiment. The sequence diagram represents the interactions and the operations involved between the legal entity analyzer 860, the retention rule generator-configuration 905 and the legal entity maintenance 880. The vertical lines of the legal entity analyzer 860, the retention rule generator-configuration 905 and the legal entity maintenance 880 represent the processes that may exist simultaneously. Activation boxes (e.g., 1010, 1020, 1030 and 1040) between the horizontal arrows represent the processes performed in the respective process object (e.g., the legal entity analyzer 860, the retention rule generator-configuration 905 and the legal entity maintenance 880).

At 1010, the legal entity analyzer 820 retrieves line organization attributes (LOA) associated with data entities. Upon retrieving the LOA, the LOA are stored in a database table accessible by the retention rule generator-configuration 905 at 1020. At 1030, the legal entity maintenance 880 provides an option to assign legal entities to the data entities based on the LOA. Further at 1040, the legal entities associated with the data entities are stored in the database table.

Figure 11:
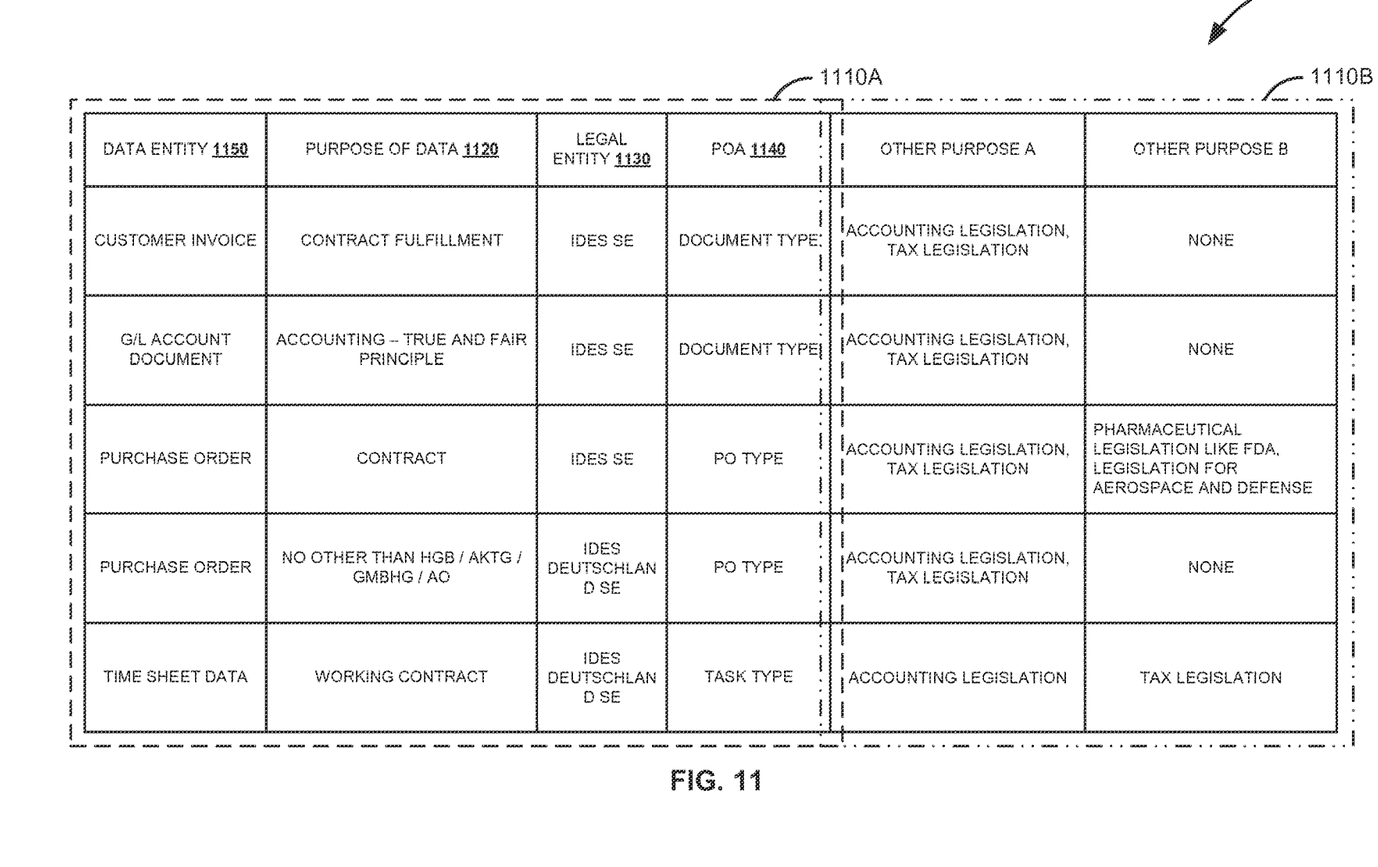
FIG. 11 is a tabular diagram illustrating an example at abstraction level, according to an embodiment.

FIG. 11 is a tabular diagram illustrating example abstraction level 1100, according to an embodiment. The example abstraction level 1100 includes both primary purposes (e.g., 1110A) as well as secondary purposes (e.g., 1110B) of the data entities to determine retention rules. The primary purposes (e.g., 1110A) may include purpose of data 1120 undergoing processing, legal entities 1130 and process organization attributes (POA) 1140 associated with the data entities 1150.

Further, the determined retention rules based on the primary purposes can be modified based on additional one or more secondary purposes (e.g., 1110B). The additional legal retention periods can be related to the legal entities and/or secondary process purposes. For example, the retention rule for a data entity "customer invoice" is determined based on "contract fulfillment" purpose of data associated with "IDES SE" legal entity and having "document type" as the POA. Further, the retention period is modified based on one or more other purposes (e.g., other purpose A and other purpose B). In the example, the retention period of data entity "customer invoice" also depends on "accounting legislation and tax legislation."

Therefore, with the described process, it is possible to identify used data entities and associated ILM objects, as well as to assign primary purpose and secondary process purposes. Thereby, determining retention rules based on the purpose of data, legal entities and process object attributes simplify retention policies for the data entities.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 12:
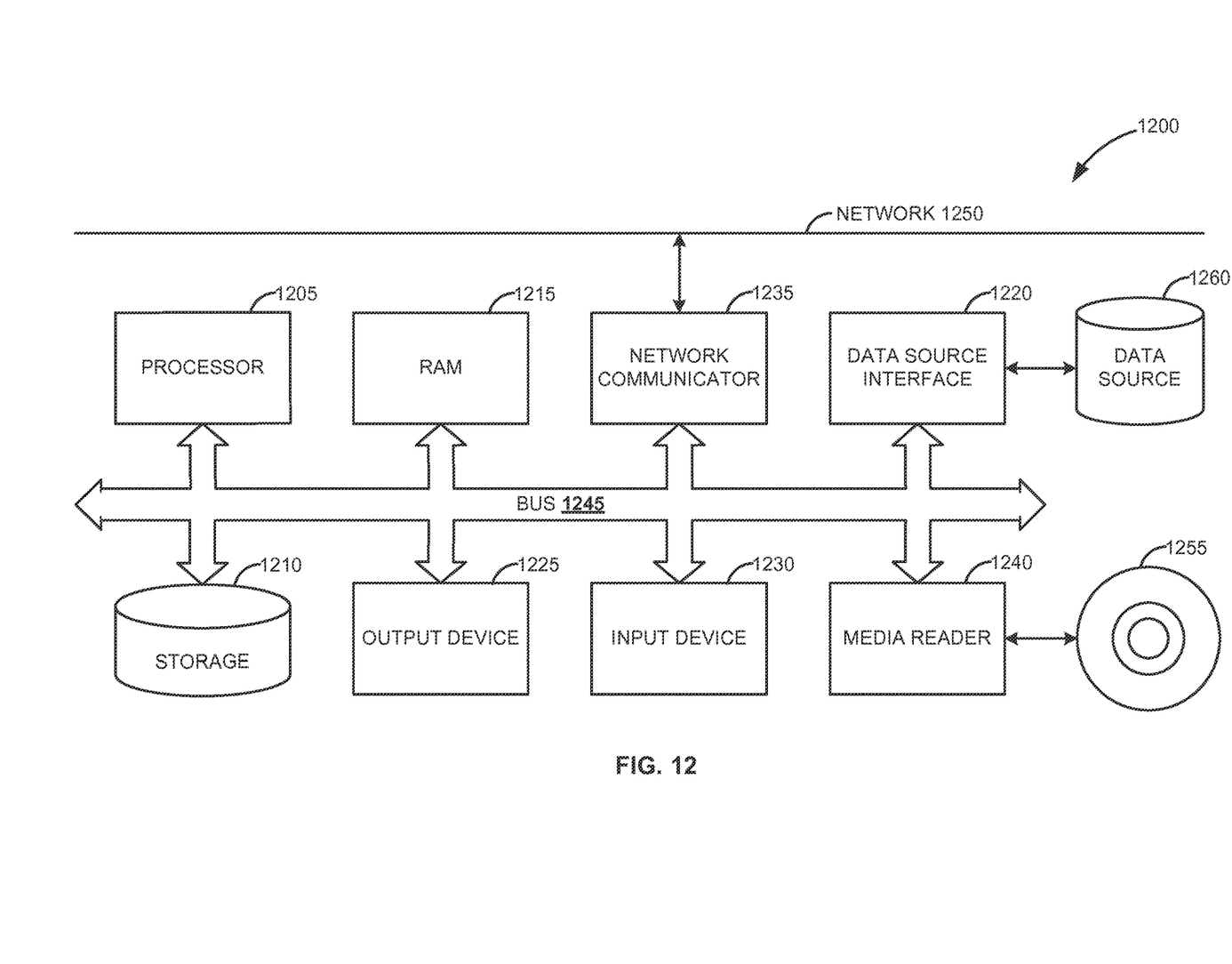
FIG. 12 is a block diagram of an exemplary computer system, according to an embodiment.

FIG. 12 is a block diagram of exemplary computer system 1200, according to an embodiment. The computer system 1200 includes a processor 1205 that executes software instructions or code stored on a computer readable storage medium 1255 to perform the above-illustrated methods. The processor 1205 can include a plurality of cores. The computer system 1200 includes a media reader 1240 to read the instructions from the computer readable storage medium 1255 and store the instructions in storage 1210 or in random access memory (RAM) 1215. The storage 1210 provides a large space for keeping static data where at least some instructions could be stored for later execution. According to some embodiments, such as some in-memory computing system embodiments, the RAM 1215 can have sufficient storage capacity to store much of the data required for processing in the RAM 1215 instead of in the storage 1210. In some embodiments, all of the data required for processing may be stored in the RAM 1215. The stored instructions may be further compiled to generate other representations of the instructions and dynamically stored in the RAM 1215. The processor 1205 reads instructions from the RAM 1215 and performs actions as instructed. According to one embodiment, the computer system 1200 further includes an output device 1225 (e.g., a display) to provide at least some of the results of the execution as output including, but not limited to, visual information to users and an input device 1230 to provide a user or another device with means for entering data and/or otherwise interact with the computer system 1200. One or more of these output devices 1225 and input devices 1230 could be joined by one or more additional peripherals to further expand the capabilities of the computer system 1200. A network communicator 1235 may be provided to connect the computer system 1200 to a network 1250 and in turn to other devices connected to the network 1250 including other clients, servers, data stores, and interfaces, for instance. The modules of the computer system 1200 are interconnected via a bus 1245. Computer system 1200 includes a data source interface 1220 to access data source 1260. The data source 1260 can be accessed via one or more abstraction layers implemented in hardware or software. For example, the data source 1260 may be accessed by network 1250. In some embodiments the data source 1260 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer cause the computer to:
   retrieve application data from a repository to obtain data entities of an organization, wherein data entities include data associated with one or more applications or application modules;
   determine usage statuses of the data entities, the usage statuses defining whether or not the data entities are used for an application process of the organization;
   receive one or more purposes of data corresponding to the data entities, wherein the one or more purposes of data define one or more basic retention periods;
   identify legal entities corresponding to the data entities based on line organization attributes and the usage statuses, wherein the legal entities comprise legally standing subsidiaries that have legal capacity to enter contracts;
   identify process object attributes associated with the data entities and corresponding to a sequence of tasks, based on the legal entities;
   determine retention rules for the data entities based on the one or more purposes of the data, the legal entities and the process object attributes;
   determine time frames of the data entities based on the determined retention rules in an information lifecycle management of the organization; and
   group the data entities into at least one of objects and rules based on the determined retention rules.

2. The non-transitory computer-readable medium of claim 1, wherein obtaining the data entities further comprises obtaining one or more information lifecycle management (ILM) objects associated with the data entities.

3. The non-transitory computer-readable medium of claim 1 further stores instructions, which when executed by the computer cause the computer to modify the determined retention rules based on additional legal retention periods, wherein the additional legal retention periods are based on at least the legal entities and secondary process purposes.

4. The non-transitory computer-readable medium of claim 1, wherein the one or more purposes of the data is at least retrieved from a database and assigned manually.

5. The non-transitory computer-readable medium of claim 1, wherein identifying the legal entities comprises receiving linkage information of the line organization attributes and corresponding legal entities.

6. The non-transitory computer-readable medium of claim 1, wherein the usage statuses are determined by an entity analyzer by evaluating usage of the data entities in a current system of the organization.

7. The non-transitory computer-readable medium of claim 1, wherein the data entities, the usage statuses and the one or more purposes are stored in a first database table, the legal entities and the line organization attributes are stored in a second database table, and the process object attributes and the retention rules are stored in a third database table.

8. A computer implemented method to determine retention rules for one or more data entities, the method comprising:
   retrieving application data from a repository to obtaining the data entities of an organization, wherein data entities include data associated with one or more applications or application modules;
   determining usage statuses of the data entities, the usage statuses defining whether or not the data entities are used for an application process of the organization;
   receiving one or more purposes of data corresponding to the data entities, wherein the one or more purposes of data define one or more basic retention periods;
   identifying legal entities corresponding to the data entities based on line organization attributes and the usage statuses, wherein the legal entities comprise legally standing subsidiaries that have legal capacity to enter contracts;
   identifying process object attributes associated with the data entities and corresponding to a sequence of tasks, based on the legal entities;
   determining retention rules for the data entities based on the one or more purposes of the data, the legal entities and the process object attributes;

determining time frames of the data entities based on the determined retention rules in an information lifecycle management of the organization; and grouping the data entities into at least one of objects and rules based on the determined retention rules.

9. The computer implemented method of claim 8, wherein obtaining the data entities further comprises obtaining information lifecycle management (ILM) objects associated with the data entities.

10. The computer implemented method of claim 8 further comprising: modifying the determined retention rules based on additional legal retention periods, wherein the additional legal retention periods are based on at least the legal entities and secondary process purposes.

11. The computer implemented method of claim 8, wherein the one or more purposes of the data is at least retrieved from a database and assigned manually.

12. The computer implemented method of claim 8, wherein identifying the legal entities comprises receiving linkage information of the line organization attributes and corresponding legal entities.

13. The computer implemented method of claim 8, wherein the usage statuses are determined by an entity analyzer by evaluating usage of the data entities in a current system of the organization.

14. The computer implemented method of claim 8, wherein the data entities, the usage statuses, and the one or more purposes are stored in a first database table, the legal entities and the line organization attributes are stored in a second database table, and the process object attributes and retention rules are stored in a third database table.

15. A computer system to provide a data retention rule generator, the computer system comprising:

at least one processor; and one or more memory devices communicative with the at least one processor, wherein the one or more memory devices store instructions to:

retrieve application data from a repository to obtain data entities of an organization, wherein data entities include data associated with one or more applications or application modules;

determine usage statuses of the data entities, the usage statuses defining whether or not the data entities are used for an application process of the organization;

receive one or more purposes of data corresponding to the data entities, wherein the one or more purposes of data define one or more basic retention periods;

identify legal entities corresponding to the data entities based on line organization attributes and the usage statuses, wherein the legal entities comprise legally standing subsidiaries that have legal capacity to enter contracts;

identify process object attributes associated with the data entities and corresponding to a sequence of tasks, based on the legal entities;

determine retention rules for the data entities based on the one or more purposes of the data, the legal entities and the process object attributes;

determine time frames of the data entities based on the determined retention rules in an information lifecycle management of the organization; and group the data entities into at least one of objects and rules based on the determined retention rules.

16. The computer system of claim 15 further comprising instructions to: modify the determined retention rules based on additional legal retention periods, wherein the additional legal retention periods are based on at least the legal entities and secondary process purposes.

17. The computer system of claim 15, wherein the data entities, the usage statuses and the one or more purposes are stored in a first database table, the legal entities and the line organization attributes are stored in a second database table, and the process object attributes and the retention rules are stored in a third database table.

* * * * *